Aug. 7, 1951 J. R. THOMAS 2,563,564
CONVERTIBLE FURNITURE
Filed May 8, 1950 2 Sheets-Sheet 1
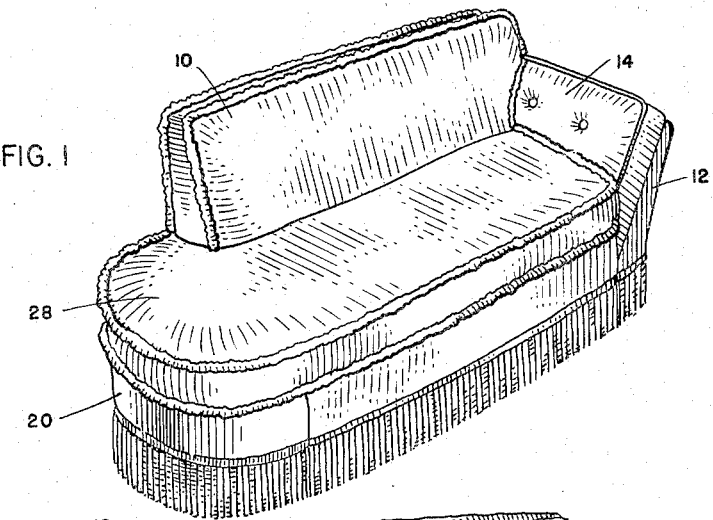
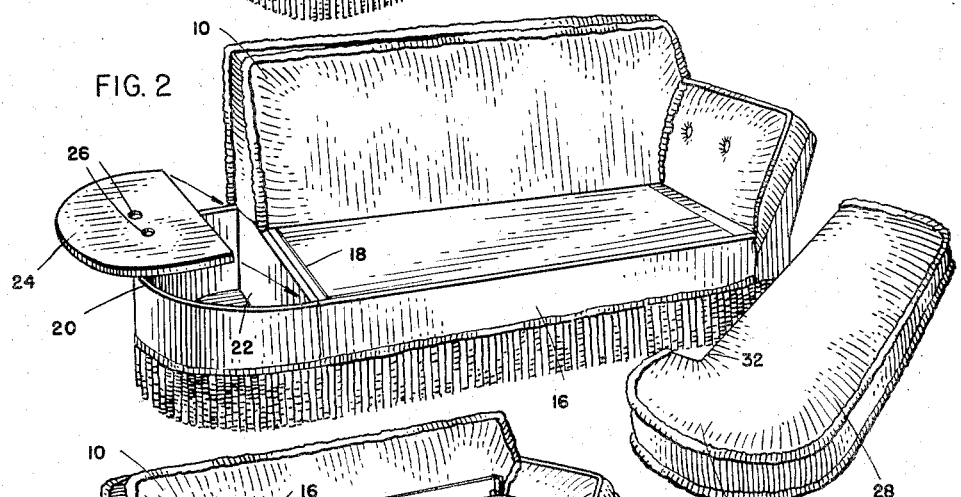
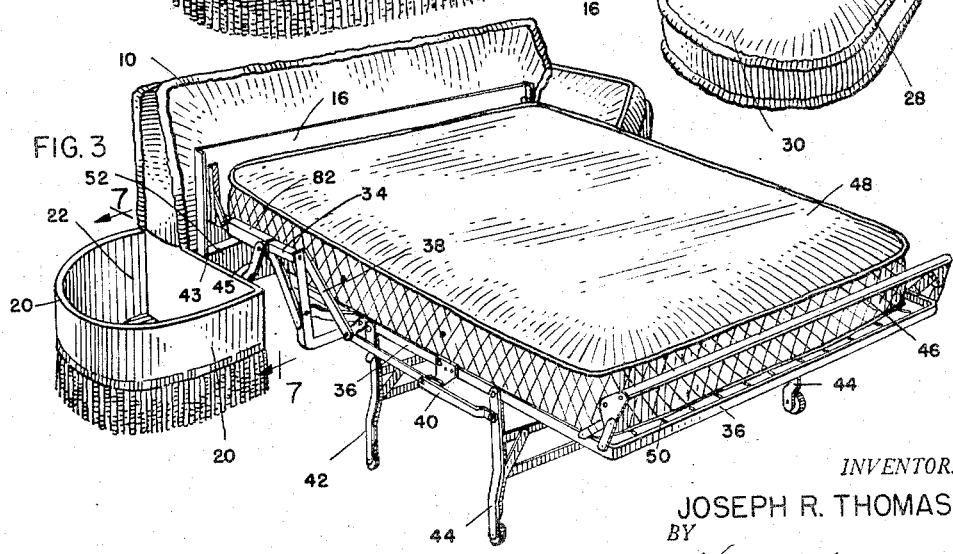
INVENTOR:
JOSEPH R. THOMAS Aug. 7, 1951 J. R. THOMAS 2,563,564
CONVERTIBLE FURNITURE
Filed May 8, 1950 2 Sheets-Sheet 2
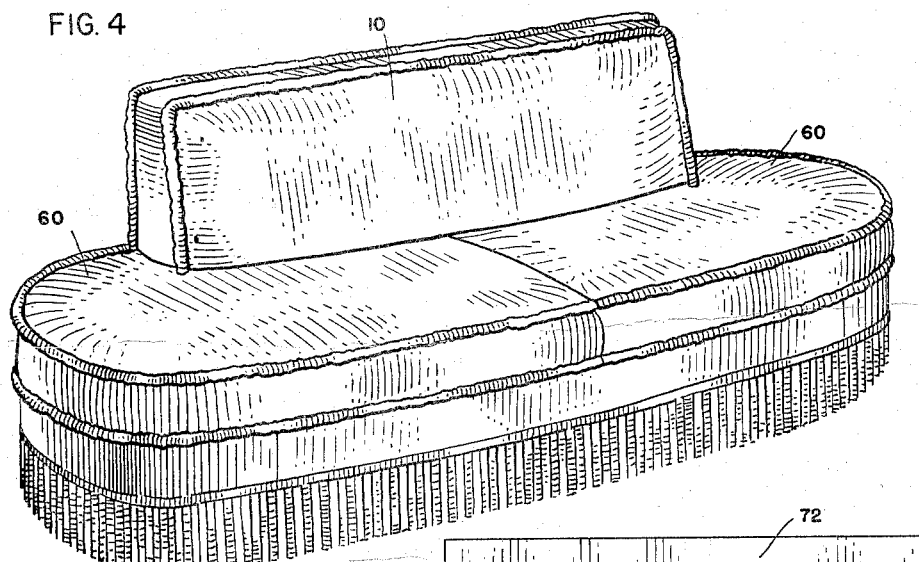
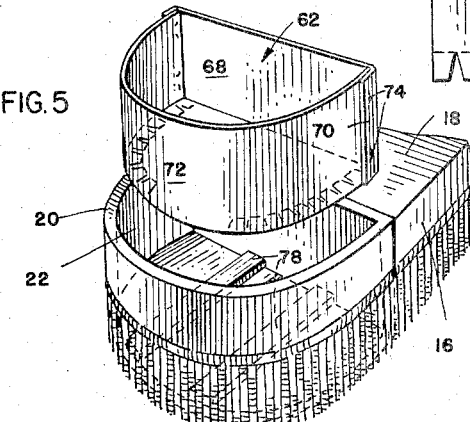
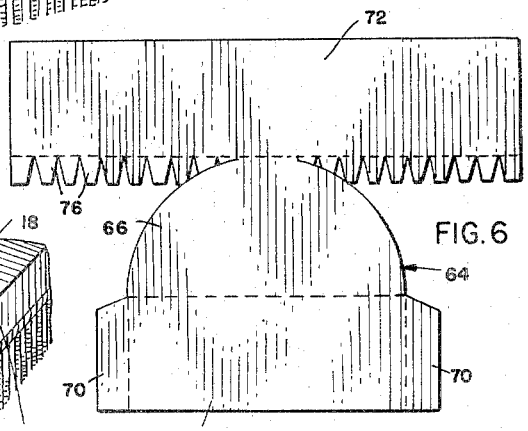
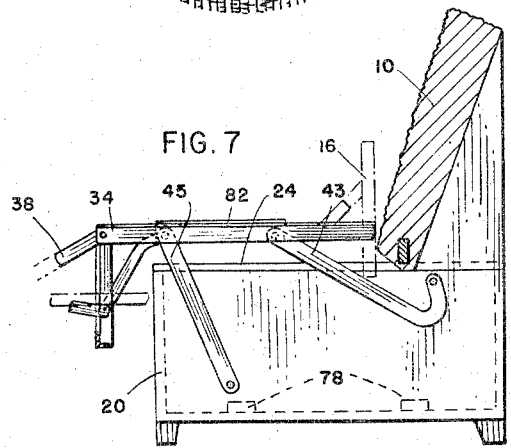
*INVENTOR:*
JOSEPH R. THOMAS
BY
ATT'Y Patented Aug. 7, 1951

2,563,564

UNITED STATES PATENT OFFICE 2,563,564

CONVERTIBLE FURNITURE

Joseph R. Thomas, Chicago, Ill.

Application May 8, 1950, Serial No. 160,743

11 Claims. (Cl. 5—58)

This invention relates in general to a combined seat, an extensible bed, and storage chamber in the general form of a chaise longue having cushioning means for covering the compartment and the bed construction, and forming a convenient and attractive piece of furniture.

In ordinary folding and extensible furniture of the convertible bed type, it is difficult to provide sufficient space for a mattress, the necessary bedding, and pillows to make up the bed for sleeping purposes, and at the same time to have a low seat which is comfortable and attractive in appearance with a cushion or cushions for the folded article of furniture. The present invention provides a convertible bed in a seat of relatively short length having the general appearance of a chaise longue but incorporating therein not only a foldable and extensible bed structure, but also providing a receptacle at one end which is covered by the cushions of the davenport when the bed structure is folded, but provides a storage space for pillows, sheets, and other articles which may be used in making up the bed, the compartment being covered by a portion of a removable cushion so that it provides an attractive article of furniture as well as a convenient arrangement of the bed structure.

An important object of the invention is to provide an article of convertible furniture in which an accessible compartment is located at either or both sides of an extensible folding bed forming a part thereof.

A further object of the invention is to provide a folding bed and a seat of short length combined with an extension at one side of the bed and at the end of the seat which forms an attractive chaise longue article of furniture, and provides a compartment into which bedding used with the extended bed may be deposited when not in use.

Still another object of the invention is to provide an article of convertible furniture comprising a foldable and extensible bed, a seat and a compartment at one or both ends of the seat covered in the folded position of the bed by a single cushion which extends over the top of the compartment and over the top of the folded bed to provide an attractive and novel article of furniture.

Other objects of the invention will appear in the specification and will be apparent from the accompanying drawings in which, Fig. 1 is a perspective view of an article of convertible furniture, in accordance with this invention;

Fig. 2 is a perspective view of the article of furniture shown in Fig. 1 with the cushion removed and an end compartment open;

Fig. 3 is a perspective view of this article of convertible furniture with the foldable bed extended between the end compartment and the head rest ready for use as a bed;

Fig. 4 is a perspective view of an article of convertible furniture in accordance with this invention having a compartment covered by a cushion at each end of the seat;

Fig. 5 is a perspective view of a liner removed from one of the compartments;

Fig. 6 is a blank of material from which the liner of Fig. 5 is constructed; and Fig. 7 is an end view showing the bed bottom mounted at the end of the frame as taken on the line 7—7 of Fig. 3.

In some folding bed constructions, the mattress is entirely omitted which leaves a space surrounding the bed in its folded position into which bedding and other material may be inserted. This is objectionable because the space is limited; usually there is not enough space to fold a mattress of any desirable size therein, and either the mattress or the bed clothes must be placed elsewhere.

In the present invention, these objections are overcome by providing a back which is shorter than the full davenport length and mounting a foldable bed structure between one end frame and a compartment at the other end, or between two end compartments, which have a height substantially the same as that of the folded bed structure alone so that when the bed structure is folded, a common cushion can be placed over the top of the compartment and over the top of the folded bed forming an attractive article of furniture which may be used as a seat or as a chaise longue without suggesting the presence of a bed therein.

Referring now more particularly to the drawings, an article of convertible furniture is shown in Fig. 1 which comprises an upholstered back 10, an upholstered end piece 12 supporting an end cushion 14 at one end of the back with a seat comprising a front board 16, and a metal folding and extensible bed bottom attached to the inside of the front board 16, collapsible into the seat frame and covered in the seat position by a fabric cover 18.

At the other end of the seat is a frame 20 secured at the bottom of the back and forming a compartment 22, rounded outwardly at the end of the frame from the front rearwardly, and preferably extending at the rear flush with the back of the frame, and presenting a neat and attractive termination of this end of the seat. At the top of the compartment is a removable cover 24 which conforms to the shape of the compartment and has central perforations 26 to assist removing and replacing the cover. When in the form of a seat, the top of the compartment is substantially level with the top of the folding bed section which can receive a unitary cushion 28 having a rounded portion 30 to fit entirely over the compartment and having a straight back portion 32 of reduced width to fit against the upholstered back 10 at the bottom thereof.

The folding bed may be of any desired or suitable construction, but usually includes frames 34 and 36 connected by links 38 and levers 40 operative to fold legs 42 and 44 against the frames when the bed structure is collapsed, and mounted on levers 43 and 45 to overturn and extend them into supporting position as shown in Fig. 3 when the front board 16 is inverted and the folding bed is extended therefrom.

At the outer end of the bed frame is a foldable rail 46 which may be extended over the end of a mattress 48 which is supported in any well known manner upon a resilient bed fabric stretched between the side frames. No particular form of folding bed is intended to be included, as any folding bed structure which may be secured to and extended from the seat frame is satisfactory.

If additional space is needed for folding the bed sections more compactly in the structure, there is a space 52 at the rear of the frame below the upholstered back 10 into which the folding bed sections may be disposed when they are collapsed or folded to form a seat.

In preparing the bed from the seat position as shown in Fig. 1, the loose cushion 28 is lifted from the folded bed and from the compartment and placed to one side which makes the compartment accessible by removing the cover 24. If it is desired to extend the bed, the front board 16 is overturned upwardly in this particular bed, and the bed sections with the mattress 48 attached thereto are unfolded outwardly, the unfolding action extending the legs 42 in a bed supporting position as shown. Any suitable folding bed structure may be included between the upholstered end piece 12 and the compartment frame 20, the sections may be unfolded without overturning the front board if a folding bed of a type for that operation is included.

Sheets, covers and pillows may be applied to the mattress and some or all of them may be contained in the compartment 22 so that they are readily accessible. After the compartment is emptied, the cover 24 may be again applied thereto for use as a stand, for a lamp, clock, radio, or any other desired article.

In changing this article of furniture from a bed to a seat, the operations above described are reversed, that is, the surplus bedding is removed from the mattress and is stored in the compartment 22. The sectional bed is folded and returned to the space between the end piece 12 and the compartment frame 20 which returns the fabric cover 18 over the exposed portion of the folding bed, the cover 24 is replaced upon the compartment, and the cushion 28 is replaced on top of the compartment cover 24 and the folding bed fabric cover 18.

If desired, the cushion 28 may be divided or formed in two parts, the line of distinction preferably appearing midway of the ends of the upholstered back 10 so that one of the cushion parts will overlap the compartment and the adjacent portion of the seat.

Instead of having an upholstered end 12 projecting above the seat cushion at one end as shown at Fig. 1, the frame may be rounded at both ends of the upholstered back 10 as shown at Fig. 4, with a rounded end frame 20 forming a compartment 22 at each end.

With this construction, a single cushion may be applied over both ends and over the folded bed bottom in the middle or two cushions 60 may be applied thereto preferably divided at the center.

Instead of attempting to finish the compartments 22 so that they will be substantially closed and tight to keep material clean therein, a liner or a compartment receptacle 62 may be formed of sheet material from a blank 64 of suitable material as shown in Fig. 6 or constructed of several pieces if desired. This receptacle is preferably made of fiber, heavy paper, cardboard, and the like, and comprises a semi-circular bottom 66 with a hinged end piece 68 having end flaps 70. At the opposite side is a connected strip 72 foldable on the bottom to form a rim, the ends being engaged by the flaps 70 which are connected by staples 74 or other suitable fastening devices, and the inner edge of the strip has foldable tongues 76 which are turned inwardly below the bottom 66 and secured thereto by staples or other suitable fastening devices. This receptacle may be substantially air-tight or at least dirt-tight so that when inserted in the frame 20, it will form a clean container for bed clothes and other articles. The receptacle 62 may be supported at the bottom of the frame 20 by cross pieces 78.

In the invertible type of folding bed construction, the supporting levers 43 and 45 as shown in Fig. 7 are preferably pivoted to the inner side of an end piece 12 or a frame 20 as shown in Fig. 7. The other ends of the levers 43 and 45 are connected to opposite sides of a supporting plate 82 in accordance with my Patent No. 2,007,988. The specific construction of the folding bed structure is not material as it may be simply an unfolding bed structure or an inverting and overturning bed structure, both types of which are commonly known and used.

With these constructions, a convenient, attractive and useful article of furniture is produced which may resemble a day bed, a love seat, and a chaise longue, or a combination of the three, depending upon the particular styling and proportions of the parts.

While preferred constructions have been described in some detail, they should be regarded by way of illustration and example rather than restrictions or limitations thereof, as many changes in the construction, combination and arrangement of the parts may be made without departing from the spirit and scope of the invention.

I claim:

1. In convertible furniture, a seat having a back, a supporting frame, an upright end piece at one end of the seat, means forming a compartment open at the top at the other end of the seat and of a height less than the upright end, a foldable bed mounted between the end piece and the compartment and extensible into and out of the frame, the bed when folded being of substantially the same height as the top of the compartment, and a seat cushion to fit on top of the compartment and upon the folded bed against the back.

2. In convertible furniture, a bed davenport having a foldable and extensible bed frame, a seat frame in which the bed frame is mounted and from which it is extensible to form a bed, a seat back at the rear of the frame, means forming a compartment attached to the frame at one end of the back which extends from the front of the seat to the rear of the back of the frame, the top of the compartment and the top of the bed in folded position being substantially the same height, and cushion means fitting over the top of the compartment and to the rear edge of the back with a narrower portion extending in front of the back and to the other end of the seat.

3. In an article of convertible furniture, a seat frame having an upholstered back, means forming a compartment at one end of the frame extending flush with the rear of the back, a foldable bed mounted in the seat frame for extensible movement from the seat frame and the compartment and when folded to extend into a space below the back in the seat frame, the top of the compartment and the top of the bed when folded being of substantially the same height, and a cushion fitting on the seat in front of the back and having a wider portion to extend over the top of the compartment and fitting at this end of the back to the rear edge of the frame.

4. The combination with a seat frame having an upholstered back with a space below it at the rear, an end piece at one end of the frame in front of the back, means forming a compartment at the other end of the frame extending to the rear of the frame at the end of the back, and a foldable and extensible bed frame mounted in the seat frame to swing from a bed position in front of the frame to a folded position within the frame and below the back, the top of the bed when folded and the top of the compartment being substantially at the same level, and a seat cushion having a wider portion conforming to the shape of the top of the compartment and a reduced portion to rest upon the folded bed in front of the upholstered back thereof.

5. In an article of convertible furniture, a seat frame having an upholstered back, an upright end piece at one end of the back, means forming a compartment at the other end of the frame and extending from front to back thereof and a portion thereof lying at the end of the back, a foldable bed mounted between the compartment and the end piece below and in front of the back and extensible forwardly therefrom, the top of the bed when folded and the top of the compartment being of substantially the same height, and a single cushion having one end conforming to the top of the compartment and fitting over the folding bed in front of the back with an angular shoulder extending around the end of the back over the compartment.

6. In an article of convertible furniture, a seat frame having an upholstered back, an end piece at one end of the frame in front of the back, means forming a compartment with a removable top at the other end of the frame extending from the front to the rear thereof, and a portion of the compartment being at the end of the back, the back terminaing approximately at the top of the compartment to provide a space below the back at the rear of the frame, and a foldable and extensible bed mounted in the frame between the compartment and the upright end of the frame and adapted to swing from a folded position below and in front of the seat back to an extended position in front of the seat back, a portion of the extended frame being between the upright end and the compartment, and a unitary cushion fitting over the top of the compartment and over the top of the folded bed and comprising a shouldered portion to fit at the end of the back at the compartment end thereof.

7. In convertible furniture, a seat frame having end supports and an upholstered back at the rear of the frame, a foldable bed mounted in the end supports and extensible therefrom to form a bed, means forming a compartment attached to each of the end supports and extending outwardly therefrom flush with the rear of the upholstered back, the top of the compartment and the top of the bed in folded position being substantially the same height, and cushion means fitting over the top of the compartment and to the rear edge of the back with a narrow portion in front of the back and entirely covering the folded bed.

8. In convertible furniture, a seat frame having end supports and a back extending between them, a foldable bed mounted in the end supports and extensible in front of the frame, means forming an open compartment at the end of the frame extending to the back of the seat substantially the height of the bed when it is folded in the frame, a lining for the compartment to provide a dirt-tight receptacle therefor, means for supporting the receptacle in the compartment, a cover for the compartment, and cushion means fitting over the top of the compartment and to the rear edge of the back with a narrow portion extending in front of the back.

9. In convertible furniture, a seat frame having end supports, a foldable bed mounted between the end supports and extensible forwardly therefrom to form a bed, means cooperating with one of said end supports to form a compartment open at its top and projecting beyond said end support, the top of the compartment and the top of the bed in folded position being substantially the same height, and a cushion removably fitting over the top of the folded bed and also over the top of the compartment.

10. In convertible furniture, a seat frame having end supports and a foldable bed mounted in the end supports and extensible forwardly therefrom to form a bed, means attached to each of the end supports and extending outwardly therefrom at the ends of the frame to form compartments open at the top, the top of the compartments and the top of the bed in folded position being substantially the same height, and cushion means removably fitting over the tops of the compartments and over the folded bed to form an upholstered seat.

11. In convertible furniture, a seat frame having end supports, a foldable bed mounted between the end supports and extensible forwardly therefrom to form a bed, means cooperating with one of said end supports to form a compartment open at its top and projecting beyond said end support, the top of the compartment and the top of the bed in folded position being substantially the same height, and cushion means removably fitting over the top of the folded bed and over the top of the compartment.

JOSEPH R. THOMAS.

REFERENCES CITED

The following references are of record in the file of this patent:

UNITED STATES PATENTS

| Number | Name | Date |
| --- | --- | --- |
| 42,368 | Grote | Apr. 19, 1864 |
| 68,164 | Buttenheim | Aug. 27, 1867 |
| 80,159 | Faller | July 21, 1868 |

FOREIGN PATENTS

| Number | Country | Date |
| --- | --- | --- |
| 14,129 | Australia | June 25, 1929 |
| 60,834 | Germany | Feb. 10, 1892 |